June 20, 1939.  R. PATERAS PESCARA  2,162,967
THERMIC PLANT
Filed Sept. 7, 1935　　3 Sheets-Sheet 1
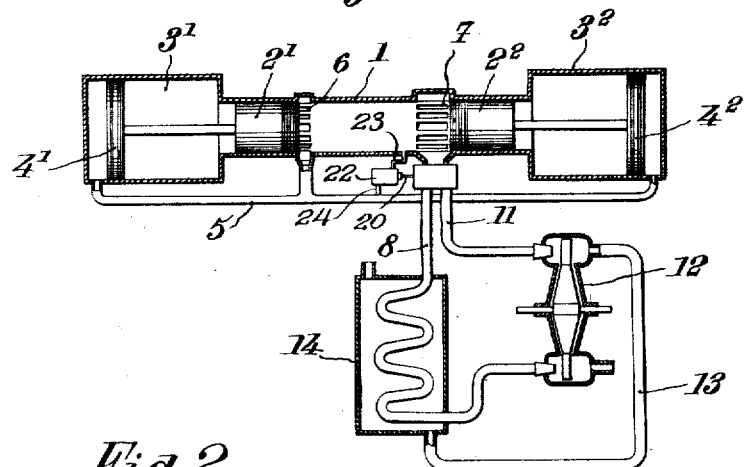
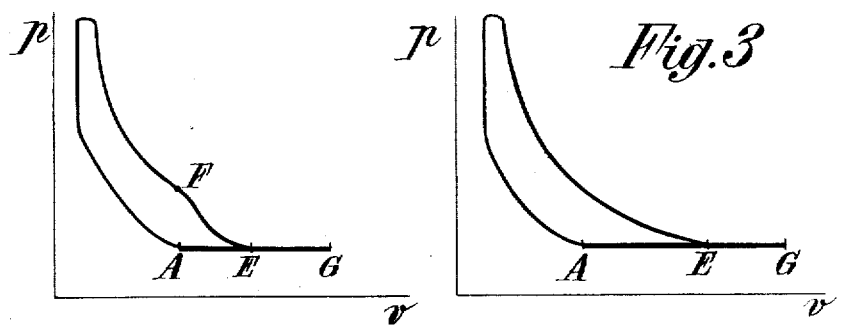
Inventor:
Raul Pateras Pescara
Attorneys:

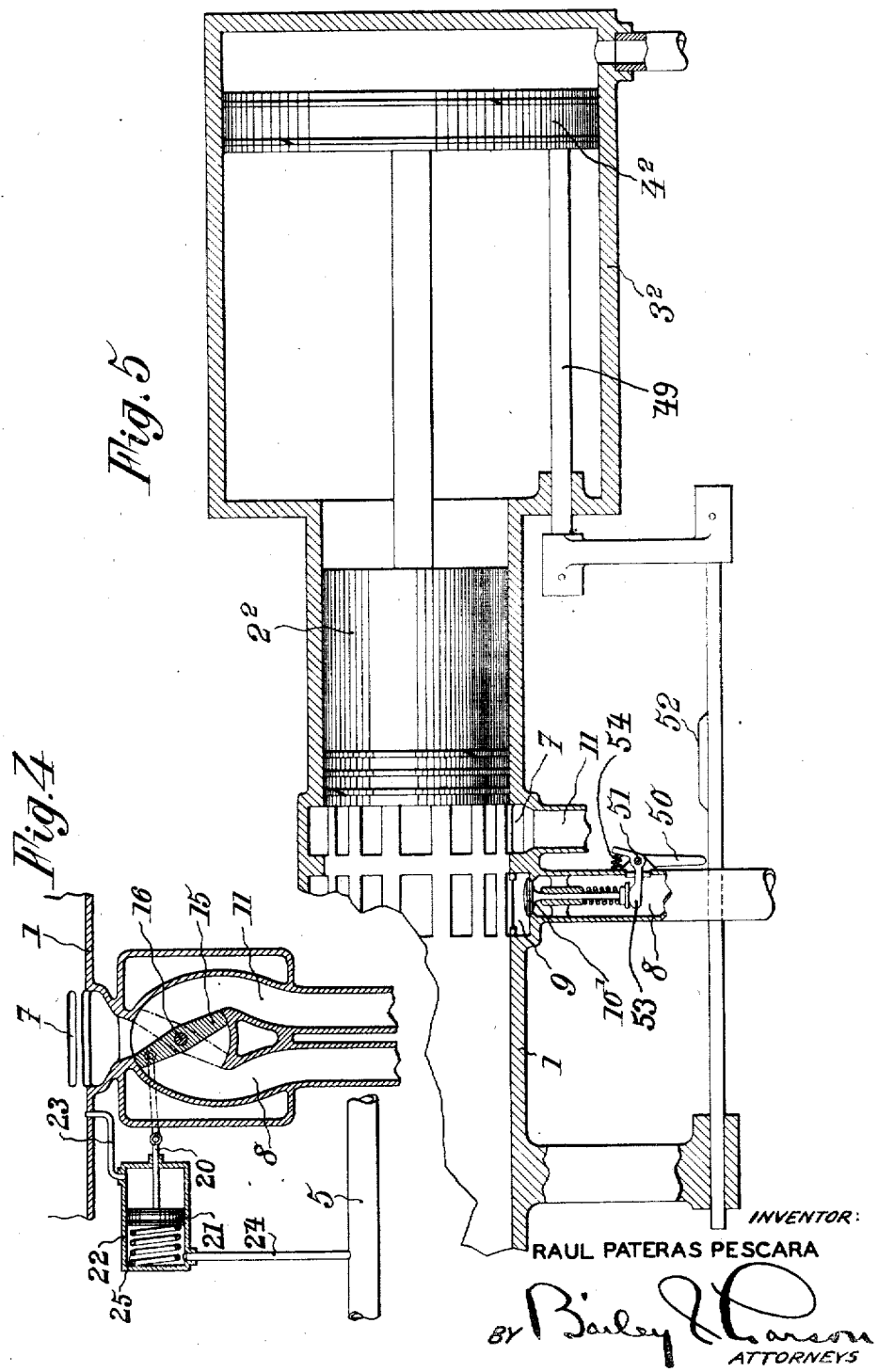

June 20, 1939.   R. PATERAS PESCARA   2,162,967
THERMIC PLANT
Filed Sept. 7, 1935   3 Sheets-Sheet 3
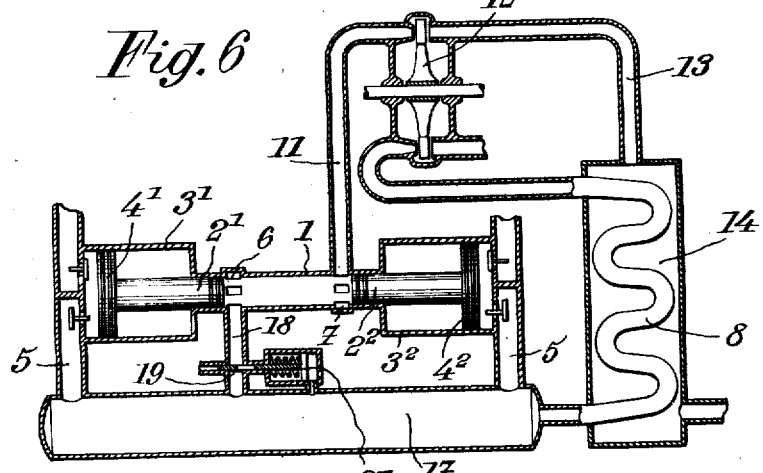
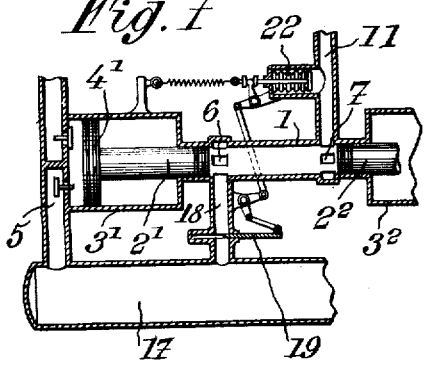
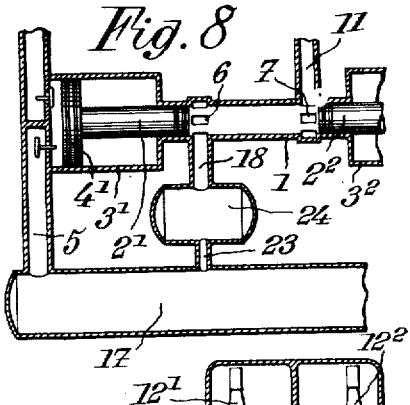
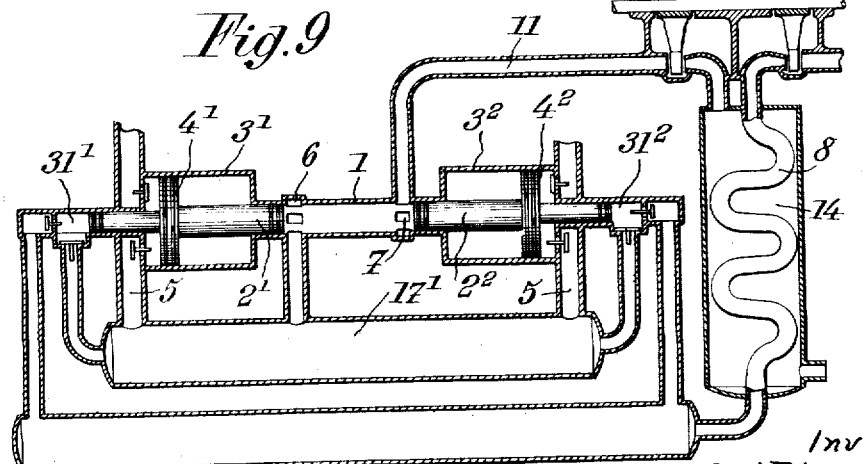

Patented June 20, 1939

2,162,967

UNITED STATES PATENT OFFICE 2,162,967

THERMIC PLANT

Raul Pateras Pescara, Paris, France, assignor to Société d'Etudes et de Participations, Eau, Gaz, Electricite, Energie, S. A., Geneva, Switzerland Application September 7, 1935, Serial No. 39,642
In Belgium September 7, 1934

10 Claims. (Cl. 60—11)

The present invention relates to thermic plants of the kind including, on the one hand, a system for producing gas under pressure, constituted by at least one internal combustion engine, such for instance as a two-stroke engine, and at least one compressor driven by said engine, and, on the other hand, at least one receiving apparatus, for instance a turbine, operated by the gas under pressure thus produced.

In some known plants of this kind, the total amount of compressed gas (more especially air) is used for scavenging the engine, and a portion only serves to the feed under pressure of the engine, whereby the compressed gases (generally in excess) are evacuated more or less in mixture with the burnt gases before reaching the receiving apparatus.

The object of the present invention is to improve the thermal efficiency of thermic plants of this kind, and this as well in the case in which the motor-compressor groups are used as generators of compressed gas at the same pressure, as when the pressures are different.

The essential feature of the present invention consists in heating the compressed gases supplied by the generator of gas under pressure (cold gases) and previously separated from the combustion gases from the engine (hot gases) before feeding said cold gases to the receiving apparatus (turbine for instance), this heating being obtained by interchange with the combustion gases from the engine after said combustion gases have been caused to work through the receiving apparatus.

Another feature of the invention consists in providing plants of this kind with automatic regulating devices which suitably proportion the amounts of fluid flowing through the engine and the fluid directly fed to the receiving apparatus, according to the pressure or the temperature at the inlet of this receiving apparatus.

Still another feature of the present invention, which concerns more especially the case in which the compressed gases and the combustion gases thus separated work both in the same receiving apparatus, consists in providing means for causing the hot and cold fluids to act alternately on the same elements, in order to maintain said elements at a mean temperature at which they work under satisfactory conditions.

Other features of the present invention shall appear from the following detailed description of some specific embodiments thereof.

Preferred embodiments of the present invention will be hereinafter described with reference to the accompanying drawings, given merely by way of example, and in which:

Fig. 1 diagrammatically shows a thermic plant according to the present invention;

Figs. 2 and 3 are diagrams of the cycle, corresponding to two different modes of working of the system;

Fig. 4 is an enlarged section through the cylinder wall and valve of Fig. 1 at the termination of the discharge passages, showing an arrangement which operates according to Fig. 2;

Fig. 5 is an enlarged section through the cylinder wall and an alternative valve at the termination of the discharge passages showing an arrangement operating according to Fig. 3;

Fig. 6 is a diagrammatic longitudinal section of a plant, made according to the invention, in which the control of the amount of fluid under pressure fed to the engine both for combustion of the engine and for scavenging is automatically ensured as a function of the pressure of said fluid;

Fig. 7 shows a modification of this system in which the control is effected in accordance with the temperature of the burnt gases;

Fig. 8 also shows a modification of this arrangement;

Fig. 9 shows a plant according to the invention in which the compressor includes two stages of pressure.

In the embodiment shown in Fig. 1, the engine I is of the two-stroke type, for instance of the kind including opposed pistons $2^1$ and $2^2$, and in which air is caused to pass through the engine on the principle called "equiflow". This engine acts on air compressors $3^1$ and $3^2$, the pistons of which are connected to the above mentioned pistons of the engine. The pistons of the compressors are designated by $4^1$ and $4^2$. The compressed air supplied by said compressors is received in a conduit 5.

This conduit 5 is connected with ports 6 provided in the wall of the cylinder of engine 1, which ports are uncovered when piston $2^1$ is close to the end of its outward stroke. The burnt gases are evacuated for instance through orifices or ports 7 uncovered by piston $2^2$ when the latter is close to the end of its outward stroke. The air under pressure serving for the scavenging of the engine also escapes through orifices or ports 7 which are preferably elongated openings through the cylinder wall.

Fig. 1 shows an exemplary embodiment for the control of the valve 15 which is shown enlarged in Fig. 4. This valve is automatically controlled so that normally a passage 11 is opened thereby, while a second passage 8 is opened only when the pressure in the cylinder 2 is nearly equal to that of the air fed through the conduit 5.

Such arrangement is shown in detail in Fig. 4. Valve 15 is pivoted on an axis or shaft 16 located at the common entrance of passages 8 and 11, this space also communicating with slots 7. A rod 20 pivotally connected to valve 15 at one end is secured at its other end to a piston 21 slidable in a cylinder 22. One end of the cylinder 22 is connected by a pipe 23 to the combustion chamber 2, while its other end is connected by a pipe 24 to the passage 5 of compressed air. A spring 25 located in the cylinder exerts a force toward the right, or toward the position in which the valve 15 directs gases from slots 7 into passage 8.

Obviously, any other well known type of differential pressure actuated mechanism for operating a valve may be used, and the specific mechanism above described forms no part of the present invention.

It is obvious from the above structure that when the pressure in the cylinder 2 is almost equal to that in the passage 5, spring 25 will push the piston 21 to the right (Fig. 4) and thus will shift valve 15. As long, however, as the pressure in cylinder 2 remains substantially higher than in passage 5 the increased pressure will overcome the force of the spring 25 and will hold the valve in the position shown in Fig. 4, in which it directs any gas issuing from the slot 7 into the passage 11. The operation and timing will be described more fully herein below in connection with Fig. 2.

The major portion of the burnt gases at a high temperature from exhaust ports 7 are collected in a conduit 11 which leads said gases to a receiving machine, such, for instance as a turbine 12, in which they expand down to a pressure equal to the external pressure, said gases remaining at a temperature higher than that of the air fed through conduit 5 and therefore higher than that of the air that has been used for the scavenging of the engine, this air being collected in conduit 8, as above explained.

An important portion of the available heat content of the burnt gases which escape from turbine 12 through conduit 13 is utilized by causing said gases to flow through a heat interchanger through which extends the conduit 8 into which the scavenging air flows. This air is thus heated before being fed to a receiving machine which may, for instanace, consist of the same turbine 12, and through which said air expands down to the external pressure and escapes through an outlet 8a.

The whole of the compressed air fed by conduit 5 may be caused to flow through the engine, so that a considerable excess of scavenging air is thus available It is also possible, as shown by Figs. 6 to 9, to feed and scavenge the engine through only a portion of the compressed air supplied by the compressor, for instance by connecting to a reservoir 17 the conduit 18 through which compressed air is fed to the engine 1 and the conduit 8 through which compressed air is fed to the receiving machine 12.

Whatever be the arrangement that is chosen, the air compressed at low temperature, whether it has been used for scavenging the engine or not, is heated in the heat interchanger 14 by the burnt gases having already expanded through receiving machine 12.

The gain of efficiency that is thus obtained is due to the thermal regeneration of the low temperature fluid by the heat otherwise lost after escape from the receiving machine, in such manner that the burnt gases escape at a temperature lower than that they would have if they had been mixed with said fluid before entering the receiving machine.

The cycle of engine 1 may have an interrupted expansion, as visible in the diagram of Fig. 2, or it may have a prolonged expansion, as visible on the diagram of Fig. 3.

In the case of Fig. 2, expansion is stopped at point E by the opening of the exhaust ports 7. In this case, the separation of the burnt gases and of the scavenging air may be obtained, for instance, through the pivoting shutter 15, (Figs. 1 and 4), the displacement of which in one direction or the other is controlled through an oscillating spindle 16 described above in connection with Fig. 1. According to the position occupied by shutter 15, the hot gases are sent to conduit 11 and the cold gases (scavenging air) are sent to conduit 8. For this purpose, shutter 15 is adapted to open conduit 11 for a portion of the stroke corresponding to FE (Fig. 2), and to close said conduit while opening conduit 8 for a portion of the stroke corresponding to EGA. At point A, when piston 2² covers ports 7, compression starts in the cylinder of engine 1.

When the expansion is prolonged (Fig. 3), the burnt gases are preferably evacuated through ports 7, distinct from the ports 9 through which the scavenging air escapes (such an arrangement being shown in Fig. 5), the conduit 8 through which this air escapes from ports 9 being stopped, at the proper time, by a suitably controlled valve 10¹. As shown in Fig. 5, the control of valve 10¹ is accomplished by the position of the piston 2², 4². Rigid with the piston 4² is a rod 49 carrying thereon a cam member 52. This cam member acts on one arm 50 of a bellcrank lever pivoted at 51 and having its other end 53 engaging the stem of valve 10¹. A coil spring 54 holds arm 53 in engagement with the valve stem.

When the piston 2² moves from the position shown in Fig. 5 to the left, at the time it covers and closes the slot 7 cam 52 engages lever 50 and swings it to the left or clockwise. Arm 53 then raises valve 10¹ so that gases may escape through slots 9 and pipe 8. When piston 2² reaches the inner ends of slots 9 and thereby closes these slots, the end of cam 52 releases lever 50, which returns under the action of the valve spring to its normal position shown in Fig. 5, and the valve 10¹ is closed.

Now when piston 2² moves to the right, or outward, when it begins to uncover slots 9, cam 52 strikes lever 50 and swings it to the right or counterclockwise. This, however, merely moves arm 53 downward and does not affect valve 10¹, so that this valve is not open during the outward stroke of the piston. The exhaust of the hot gases, which begins at point E, when piston 2² uncovers ports 7, takes place for the portion of the stroke (corresponding to EGE) during which valve 10¹ is closed. On the contrary, the exhaust of the scavenging air may take place during the portion of the stroke (corresponding to EA) for which valve 10¹ is open and ports 7 are covered by piston 2². At point A, piston 2² also covers ports 9 and compression starts in the cylinder of engine 1.

In Figs. 6, 7 and 8, I have shown, by way of example, some embodiments in which the stream of scavenging air is branched in shunt on the conduit of compressed air leading to the receiving machine; that is, a portion of the compressed air goes directly to the receiving machine while a second portion goes to the receiving machine by way of the cylinder of the engine.

In this case, the amount of scavenging air may be automatically proportioned, for instance by means of a valve 19 provided in the conduit 18 through which air is fed from reservoir 17 to the engine.

This valve 19 may be operated in various manners.

For instance, in the embodiment of Fig. 6, valve 19 is controlled by the pressure of reservoir 17, the compressed air operating a piston 21 connected with slide valve 19.

Alternately, in the embodiment of Fig. 7, valve 19 is operative by the temperature at the inlet of receiving machine 12, through a thermostat 22 subjected to the action of this temperature. It should be noted that this adjusting arrangement, automatically operated by the temperature, is advantageous in that it permits of increasing the power for short periods of time without modifying the amount of scavenging air, because the elevation of temperature of the receiving machine takes place but slowly.

According to a modification, shown in Fig. 8, valve 19 is dispensed with, and replaced by a mere calibrated passage 23 extending between reservoir 17 and a reservoir 24 of small volume.

The principle of recuperating the heat of the burnt gases after a preliminary separation of the fluids into two portions is also applicable to generators in which the feed pressure is different from the final pressure of compression. By way of example, a plant including a multiple stage compressor is diagrammatically shown in Fig. 9. In this embodiment, the air for scavenging and feeding the engine may be obtained from a reservoir 17¹ into which is discharged the fluid from the first stage of compression, corresponding to cylinders 3¹ and 3². When issuing from the engine, the burnt gases are expanded into the first stage 12¹ of the receiving machine, and when issuing from said stage, these hot gases heat, in heat interchanger 14, the cold gases compressed in the cylinders of the second stage of compression, to wit 31¹ and 31², this interchanger being disposed before the second stage 12² of the receiving machine, in which the heated gases are finally expanded.

When the receiving machine consists of a turbine such as 12, the burnt gases escaping through ports 7 and received through conduit 11 might have too high a temperature for a good working of the blades of the turbine.

Advantageously, in order to obviate this drawback, a mean temperature of the blades is maintained because, as shown in Figs. 1 and 6, the blades passed alternately through the hot gases from conduit 11 and the cooler gases from conduit 8.

Of course, the invention is also applicable to motor-generators having free pistons, as known in themselves.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A plant which comprises, in combination, an internal combustion engine of the two stroke type, an air compressor arranged to be driven by said engine, a receiving machine adapted to be driven by fluid under pressure having at least two stages, means for feeding air under pressure from said compressor to said engine for scavenging purposes, means for causing the combustion gases from said engine to expand by driving one of the stages of said receiving machine, means for conveying air under pressure from said compressor to a second stage of the receiving machine, two outlet openings in said receiving machine, the first of which serves for the outlet of the combustion gases after they have expanded in the receiving machine, and the other of which serves for the outlet of the air under pressure from said second stage of the receiving machine, and means for causing the expanded combustion gases, after their expansion through said receiving machine, to give up heat to the air under pressure on its way from said compressor to said second mentioned stage of the receiving machine through said conveying means.

2. A plant according to claim 1 in which said compressor is of the two-stage type, further including a first reservoir connected with the first stage of compression of said compressor and opening into said engine, and a second reservoir connected with the second stage of compression of said compressor and communicating directly with the second mentioned stage of the receiving machine.

3. A power plant which comprises in combination, a gas motor-compressor and a receiving machine adapted to be operated by gas under pressure, said motor compressor comprising a motor cylinder and at least one compression cylinder, in which gaseous products including combustion gas and compressed gas are produced, at least one piston adapted to slide freely in said motor cylinder and at least one piston slidable in said compression cylinder, means operatively connecting said pistons, means for feeding at least a part of the gas compressed in said compression cylinder to said motor cylinder, means for conducting a part of said gaseous products including at least the major portion of the hot combustion gas to said receiving machine, means for conveying away such part of the gaseous product after it has expanded in the receiving machine, means for conveying the rest of the gaseous product which contains at most a minor portion of the combustion gas to the receiving machine, and means for causing said expanded part to give off heat to the last mentioned part on its way to the receiving machine.

4. A power plant as claimed in claim 3, said receiving machine being a turbine.

5. A power plant which comprises, in combination, an air motor compressor and a receiving machine adapted to be operated by gas under pressure, said motor compressor comprising a motor cylinder and at least one compression cylinder in which gaseous products including combustion gas and compressed air are produced, at least one piston adapted to slide freely in said motor cylinder, a piston slidable in said compression cylinder, means operatively connecting said pistons, means for feeding a portion of the air compressed in said compression cylinder to said motor cylinder for scavenging purposes, means for conveying the mixture of combustion gases and scavenging air to said receiving machine, an outlet opening in said receiving machine which serves for the outlet of the combustion gases and scavenging air after they have expanded in the receiving machine, means for conveying away said mixture from said outlet opening after it has expanded in said receiving machine, means for conveying the other part of compressed air directly to said receiving machine, a second outlet opening which serves for the outlet of the said other part of compressed air from the receiving machine, and means for causing said expanded mixture to give off heat to the last mentioned compressed air on its way to said receiving machine.

6. A power plant substantially as claimed in claim 5, and automatic means operated by said air for adjusting the flow of compressed air from said compressor cylinder to said motor cylinder.

7. A power plant substantially as claimed in claim 5, and means operated by the pressure of the compressed air for automatically adjusting the flow of air under pressure from said compressor cylinder to said motor cylinder.

8. A power plant which comprises, in combination, an air motor compressor and a receiving machine adapted to be operated by gas under pressure, said motor compressor comprising a motor cylinder and at least one compression cylinder, at least one piston adapted to slide freely in said motor cylinder, a piston slidable in said compression cylinder, means operatively connecting said pistons, at least one outlet port in said motor cylinder arranged in such manner as to produce exhaust of the combustion gases before the full end of the expansion stroke, a receiving machine adapted to be operated by expansion of fluid under pressure, means for feeding the compressed air from said compressor to said engine for scavenging purposes, at least two conduits adapted to convey gases to said receiving machine from said outlet port, means for alternately connecting said port with said conduits in such manner that the gaseous products flow through said cylinder and said conduits respectively in two parts one containing at least the major portion of the combustion gases and the other containing at most a minor portion thereof, and means for causing the first part to give up heat to the second part on its way to said receiving machine through the second mentioned conduit.

9. A power plant which comprises in combination an internal combustion engine of the two stroke type, a gas compressor arranged to be driven by said engine, a receiving machine adapted to be operated by gas under pressure from said compressor, means for dividing the total amount of compressed gases in two gas streams of different temperature, means for feeding said two gas streams separately to the receiving machine, two outlet openings in said receiving machine, the first of which serves for the outlet of the gases of the warmer gas stream after they have expanded in the receiving machine, whereas the second one serves for the outlet of the gases of the cooler gas stream after they have expanded in the receiving machine, and means for causing the expanded gases of the warmer gas stream to give off heat to the gases of the cooler gas stream on their way to the receiving machine.

10. A power plant which comprises in combination, a gas motor-compressor and a receiving machine adapted to be operated by gas under pressure, said motor compressor comprising a motor cylinder and at least one compression cylinder, in which gaseous products including combustion gas and compressed gas are produced, at least one piston adapted to slide freely in said motor cylinder and at least one piston slidable in said compression cylinder, means operatively connecting said pistons, means for feeding at least a part of the gas compressed in said compression cylinder to said motor cylinder, means for conducting a part of said gaseous products including at least the major portion of the hot combustion gas to said receiving machine, said receiving machine having an outlet opening for such part of the gaseous product after it has expanded in the receiving machine, means for conveying away said expanded part of the gaseous product, means for conveying the rest of the gaseous product which contains at most a minor portion of the combustion gas to the receiving machine, means for causing said expanded part to give off heat to the last mentioned part of its way to the receiving machine and a second outlet opening in said receiving machine for letting out the last mentioned part after it has expanded in the receiving machine.

RAUL PATERAS PESCARA.

CERTIFICATE OF CORRECTION.

Patent No. 2,162,967.   June 20, 1939.

RAUL PATERAS PESCARA.

It is hereby certified that the above numbered patent was erroneously issued to "SOCIÉTÉ D'ETUDES ET DE PARTICIPATIONS, EAU, GAZ, ELECTRICITE, ENERGIE, S. A.", as assignee of the entire interest in said invention, whereas said patent should have been issued to the inventor, said "PESCARA" as assignor of one-tenth to Société d'Etudes et de Participations, Eau, Gaz, Electricite, Energie, S. A., of Geneva, Switzerland, as shown by the record of assignments in this office; and that the said Letters Patent should be read with this correction therein that the same may conform to the record of the case in the Patent Office.

Signed and sealed this 19th day of September, A. D. 1939.

(Seal)

Henry Van Arsdale,
Acting Commissioner of Patents.

motor cylinder for scavenging purposes, means for conveying the mixture of combustion gases and scavenging air to said receiving machine, an outlet opening in said receiving machine which serves for the outlet of the combustion gases and scavenging air after they have expanded in the receiving machine, means for conveying away said mixture from said outlet opening after it has expanded in said receiving machine, means for conveying the other part of compressed air directly to said receiving machine, a second outlet opening which serves for the outlet of the said other part of compressed air from the receiving machine, and means for causing said expanded mixture to give off heat to the last mentioned compressed air on its way to said receiving machine.

6. A power plant substantially as claimed in claim 5, and automatic means operated by said air for adjusting the flow of compressed air from said compressor cylinder to said motor cylinder.

7. A power plant substantially as claimed in claim 5, and means operated by the pressure of the compressed air for automatically adjusting the flow of air under pressure from said compressor cylinder to said motor cylinder.

8. A power plant which comprises, in combination, an air motor compressor and a receiving machine adapted to be operated by gas under pressure, said motor compressor comprising a motor cylinder and at least one compression cylinder, at least one piston adapted to slide freely in said motor cylinder, a piston slidable in said compression cylinder, means operatively connecting said pistons, at least one outlet port in said motor cylinder arranged in such manner as to produce exhaust of the combustion gases before the full end of the expansion stroke, a receiving machine adapted to be operated by expansion of fluid under pressure, means for feeding the compressed air from said compressor to said engine for scavenging purposes, at least two conduits adapted to convey gases to said receiving machine from said outlet port, means for alternately connecting said port with said conduits in such manner that the gaseous products flow through said cylinder and said conduits respectively in two parts one containing at least the major portion of the combustion gases and the other containing at most a minor portion thereof, and means for causing the first part to give up heat to the second part on its way to said receiving machine through the second mentioned conduit.

9. A power plant which comprises in combination an internal combustion engine of the two stroke type, a gas compressor arranged to be driven by said engine, a receiving machine adapted to be operated by gas under pressure from said compressor, means for dividing the total amount of compressed gases in two gas streams of different temperature, means for feeding said two gas streams separately to the receiving machine, two outlet openings in said receiving machine, the first of which serves for the outlet of the gases of the warmer gas stream after they have expanded in the receiving machine, whereas the second one serves for the outlet of the gases of the cooler gas stream after they have expanded in the receiving machine, and means for causing the expanded gases of the warmer gas stream to give off heat to the gases of the cooler gas stream on their way to the receiving machine.

10. A power plant which comprises in combination, a gas motor-compressor and a receiving machine adapted to be operated by gas under pressure, said motor compressor comprising a motor cylinder and at least one compression cylinder, in which gaseous products including combustion gas and compressed gas are produced, at least one piston adapted to slide freely in said motor cylinder and at least one piston slidable in said compression cylinder, means operatively connecting said pistons, means for feeding at least a part of the gas compressed in said compression cylinder to said motor cylinder, means for conducting a part of said gaseous products including at least the major portion of the hot combustion gas to said receiving machine, said receiving machine having an outlet opening for such part of the gaseous product after it has expanded in the receiving machine, means for conveying away said expanded part of the gaseous product, means for conveying the rest of the gaseous product which contains at most a minor portion of the combustion gas to the receiving machine, means for causing said expanded part to give off heat to the last mentioned part of its way to the receiving machine and a second outlet opening in said receiving machine for letting out the last mentioned part after it has expanded in the receiving machine.

RAUL PATERAS PESCARA.

CERTIFICATE OF CORRECTION.

Patent No. 2,162,967.   June 20, 1939.

RAUL PATERAS PESCARA.

It is hereby certified that the above numbered patent was erroneously issued to "SOCIÉTÉ D'ETUDES ET DE PARTICIPATIONS, EAU, GAZ, ELECTRICITE, ENERGIE, S. A.", as assignee of the entire interest in said invention, whereas said patent should have been issued to the inventor, said "PESCARA" as assignor of one-tenth to Société d'Etudes et de Participations, Eau, Gaz, Electricite, Energie, S. A., of Geneva, Switzerland, as shown by the record of assignments in this office; and that the said Letters Patent should be read with this correction therein that the same may conform to the record of the case in the Patent Office.

Signed and sealed this 19th day of September, A. D. 1939.

(Seal)

Henry Van Arsdale,
Acting Commissioner of Patents.